(12) United States Patent
Kim et al.

(10) Patent No.: US 9,420,435 B2
(45) Date of Patent: Aug. 16, 2016

(54) METHOD AND APPARATUS FOR AUTOMATICALLY GENERATING AND MANAGING GROUPS IN ADDRESS BOOK

(75) Inventors: Il-joo Kim, Seoul (KR); Young-chul Sohn, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 651 days.

(21) Appl. No.: 13/438,041

(22) Filed: Apr. 3, 2012

(65) Prior Publication Data
US 2013/0060853 A1 Mar. 7, 2013

(30) Foreign Application Priority Data
Sep. 1, 2011 (KR) .................. 10-2011-0088552

(51) Int. Cl.
*G06F 15/16* (2006.01)
*H04W 4/08* (2009.01)
*G06Q 10/10* (2012.01)

(52) U.S. Cl.
CPC *H04W 4/08* (2013.01); *G06Q 10/10* (2013.01)

(58) Field of Classification Search
CPC .................................................. G06F 17/30283
USPC ........................................................ 709/204
See application file for complete search history.

(56) References Cited

U.S. PATENT DOCUMENTS

| | | | | |
|---|---|---|---|---|
| 6,370,573 B1* | 4/2002 | Bowman-Amuah | .......... | 709/223 |
| 6,449,622 B1* | 9/2002 | LaRue | ............. | G06F 17/30575 |
| 6,473,794 B1* | 10/2002 | Guheen et al. | ................ | 709/223 |
| 7,167,899 B2* | 1/2007 | Lee et al. | ..................... | 709/204 |
| 7,167,910 B2* | 1/2007 | Farnham et al. | ............. | 709/223 |
| 7,505,974 B2* | 3/2009 | Gropper | ................ | G06Q 30/02 |
| 7,885,937 B2* | 2/2011 | Beadle et al. | ................. | 707/673 |
| 7,904,511 B2* | 3/2011 | Ryan et al. | ..................... | 709/204 |
| 7,933,587 B1* | 4/2011 | Swan | ......................... | 455/412.1 |
| 8,271,649 B2* | 9/2012 | Kalofonos et al. | ............ | 709/225 |
| 8,296,398 B2* | 10/2012 | Lacapra et al. | ............... | 709/219 |
| 8,306,506 B1* | 11/2012 | Swan | ......................... | 455/412.1 |
| 8,316,128 B2* | 11/2012 | Beck | .................... | G06Q 10/107 709/204 |
| 8,364,711 B2* | 1/2013 | Wilkins | ................. | G06Q 10/10 707/783 |
| 8,374,179 B2* | 2/2013 | Thomas | .............. | H04L 12/1868 370/337 |
| 8,386,558 B2* | 2/2013 | Schleifer et al. | ............. | 709/203 |
| 8,510,137 B2* | 8/2013 | Bonev | ............... | G06F 17/30029 705/1.1 |
| 8,521,817 B2* | 8/2013 | Ryan et al. | ..................... | 709/204 |
| 8,600,360 B1* | 12/2013 | Patvarczki et al. | ......... | 455/414.3 |
| 8,601,022 B2* | 12/2013 | Gropper | ................. | G06Q 30/02 707/770 |
| 2002/0049751 A1* | 4/2002 | Chen et al. | ........................ | 707/3 |
| 2003/0051003 A1* | 3/2003 | Clark | .................... | G06Q 10/10 709/218 |
| 2003/0167324 A1* | 9/2003 | Farnham et al. | ............. | 709/224 |
| 2005/0198125 A1* | 9/2005 | Macleod Beck et al. | ..... | 709/204 |
| 2006/0123127 A1* | 6/2006 | Littlefield | ...................... | 709/229 |
| 2007/0250566 A1* | 10/2007 | Appelman et al. | ........... | 709/204 |
| 2008/0082541 A1* | 4/2008 | Davidson et al. | ............... | 707/10 |
| 2008/0114830 A1* | 5/2008 | Welingkar et al. | ............ | 709/203 |
| 2009/0216569 A1* | 8/2009 | Bonev et al. | ...................... | 705/5 |
| 2010/0205546 A1* | 8/2010 | Appelman et al. | ............ | 715/758 |
| 2010/0306185 A1* | 12/2010 | Smith et al. | ................... | 707/709 |

(Continued)

FOREIGN PATENT DOCUMENTS

KR 1020100137756 A 12/2010

*Primary Examiner* — Kevin Bates
*Assistant Examiner* — Clarence McCray
(74) *Attorney, Agent, or Firm* — Sughrue Mion, PLLC (57) ABSTRACT

A method and apparatus for organizing groups in an address book by referencing groups in other address books to organize the groups in the address book.

20 Claims, 9 Drawing Sheets

(56) References Cited

U.S. PATENT DOCUMENTS

| | | | |
|---|---|---|---|
| 2011/0035673 A1* | 2/2011 | Chou et al. | 715/739 |
| 2011/0060801 A1* | 3/2011 | Virk et al. | 709/206 |
| 2011/0113094 A1* | 5/2011 | Chunilal | 709/204 |
| 2011/0113113 A1* | 5/2011 | Ryan et al. | 709/206 |
| 2011/0162038 A1* | 6/2011 | Chunilal | 726/1 |
| 2011/0179176 A1* | 7/2011 | Ravichandran et al. | 709/226 |
| 2012/0019365 A1* | 1/2012 | Tuikka et al. | 340/10.1 |
| 2012/0109830 A1* | 5/2012 | Vogel | 705/75 |
| 2012/0304257 A1* | 11/2012 | Kalofonos et al. | 726/4 |

* cited by examiner

METHOD AND APPARATUS FOR AUTOMATICALLY GENERATING AND MANAGING GROUPS IN ADDRESS BOOK

CROSS-REFERENCE TO RELATED PATENT APPLICATION

This application claims priority from Korean Patent Application No. 10-2011-0088552, filed on Sep. 1, 2011, in the Korean Intellectual Property Office, the disclosure of which is incorporated herein by reference in its entirety.

BACKGROUND

1. Field

Methods and apparatuses consistent with the exemplary embodiments relate to a method and apparatus for automatically generating and managing groups in an address book of which contents are not grouped.

2. Description of the Related Art

Due to broadening of personal connections, it is becoming more important to manage personal connections. Conventional methods require users to personally generate groups in an address book and manage the generated groups. Moreover, when the address book has been moved from one terminal to another terminal, it may be necessary to change a large amount of contents of the address book if the contents of the address book have not been grouped. In this case, although changing of the contents of the address book may be performed by using a computer, it is required to go through complicated processes in the computer and personally check and classify the contents of the address book in detail.

The present invention provides a method of grouping and managing contents of an address book to improve convenience of users.

To group and manage contents of an address book used in a terminal, according to a conventional method, first, it is required to generate groups necessary in the terminal. In a case of storing a new phone number in the address book, it is necessary to assign the new phone number to one of the generated groups after inputting the new phone number to the address book. To group phone numbers previously stored in the address book, it is required to enter the address book into an edit mode and then select a group name from among group names previously set for a previously stored phone number. In this manner, it is required to change the address book one entry at a time by using the above-stated method to group phone numbers not grouped in the address book.

SUMMARY

Exemplary embodiments provide a method and apparatus for extracting a list of people who are already grouped and managed in address books stored in terminals of other users, and generating group names based on the list, and for grouping unarranged people in an address book stored in a user's terminal by classifying the people by matching information, such as phone numbers, stored in the address book to information included in the extracted list.

According to an aspect of an exemplary embodiment, there is provided a method of managing an address book in a server, the method including: receiving from a user's terminal a request to organize the address book, the request including the address book; generating a new address book based on the received address book; and transmitting the generated new address book to the user's terminal.

The generated new address book may include an address book that is arranged to include a representative group that is set by collecting address books of other users that include information about the user.

The representative group may be set by recognizing similar group names according to group characteristics in the collected address books of the other users.

The generated new address book may be generated by using a hierarchical structure.

If the collected address books have a relative concept, the generated new address book may be an arranged address book based on: a representative group set in a relative relation to the user, and group information having a similar relation to the user collected from the other users' address books.

The method may further include synchronizing an address book of the server and the address book of the user's terminal.

The method may further include, if there is a change in an address book managed in the server, informing the user about the change.

The address book may include at least one of an address book of a mobile device and an address book of a social network system (SNS).

According to another aspect of an exemplary embodiment, there is provided a method of managing an address book in a user's terminal, the method including: transmitting to a server a request to organize the address book stored in the user's terminal, the request including the address book; receiving from the server a new address book generated based on the provided address book; and storing the received new address book.

The method may further include synchronizing an address book of the server and the address book of the user's terminal.

The address book may include at least one of an address book of a mobile device and an address book of a social network system (SNS).

According to another aspect of an exemplary embodiment, there is provided an apparatus for managing an address book, the apparatus including: a storing unit that stores the address book; a reception unit that receives from a user's terminal a request to organize the address book, the request including the address book; a control unit that generates a new address book based on the address book received by the reception unit; and a transmission unit transmits the generated new address book to the user's terminal.

The control unit may be further configured to set a representative group by collecting address books of other users that include information about the user, and generate the new address book arranged based on the representative group.

The control unit may be further configured to set the representative group by recognizing similar group names according to group characteristics in the collected address books of the other users.

The control unit may be configured to generate the new address book by using a hierarchical structure.

If the collected address books have a relative concept, the control unit may be further configured to generate the new address book based on: a representative group set in a relative relation to the user, and group information having a similar relation to the user collected from the other users' address books.

The control unit may be further configured to synchronize an address book of the apparatus for managing an address book and the address book of the user's terminal.

If there is a change in an address book managed in the apparatus for managing an address book, the control unit may be further configured to inform the user about the change.

According to another aspect of an exemplary embodiment, there is provided an apparatus for managing an address book, the apparatus including: a transmission unit that transmits to a server a request to organize the address book stored in a user's terminal, the request including the address book and the server storing another address book; a reception unit that receives from the server a new address book generated based on the provided address book; and a storing unit that stores the received new address book.

The apparatus may further include a control unit that synchronizes the another address book stored in the server and the address book of the user's terminal.

According to the exemplary embodiments, a shortcoming of the conventional art, in which a user should manually set a necessary group name and edit, one entry at a time, information about other users not grouped in the user's address book, by automatically generating groups with reference to the other users' address books including information about the user, may be solved.

BRIEF DESCRIPTION OF THE DRAWINGS

The above and other aspects will become more apparent by describing in detail exemplary embodiments thereof with reference to the attached drawings in which.

DETAILED DESCRIPTION OF THE EXEMPLARY EMBODIMENTS

Hereinafter, the exemplary embodiments will be described in detail with reference to the attached drawings.

Figure 1:
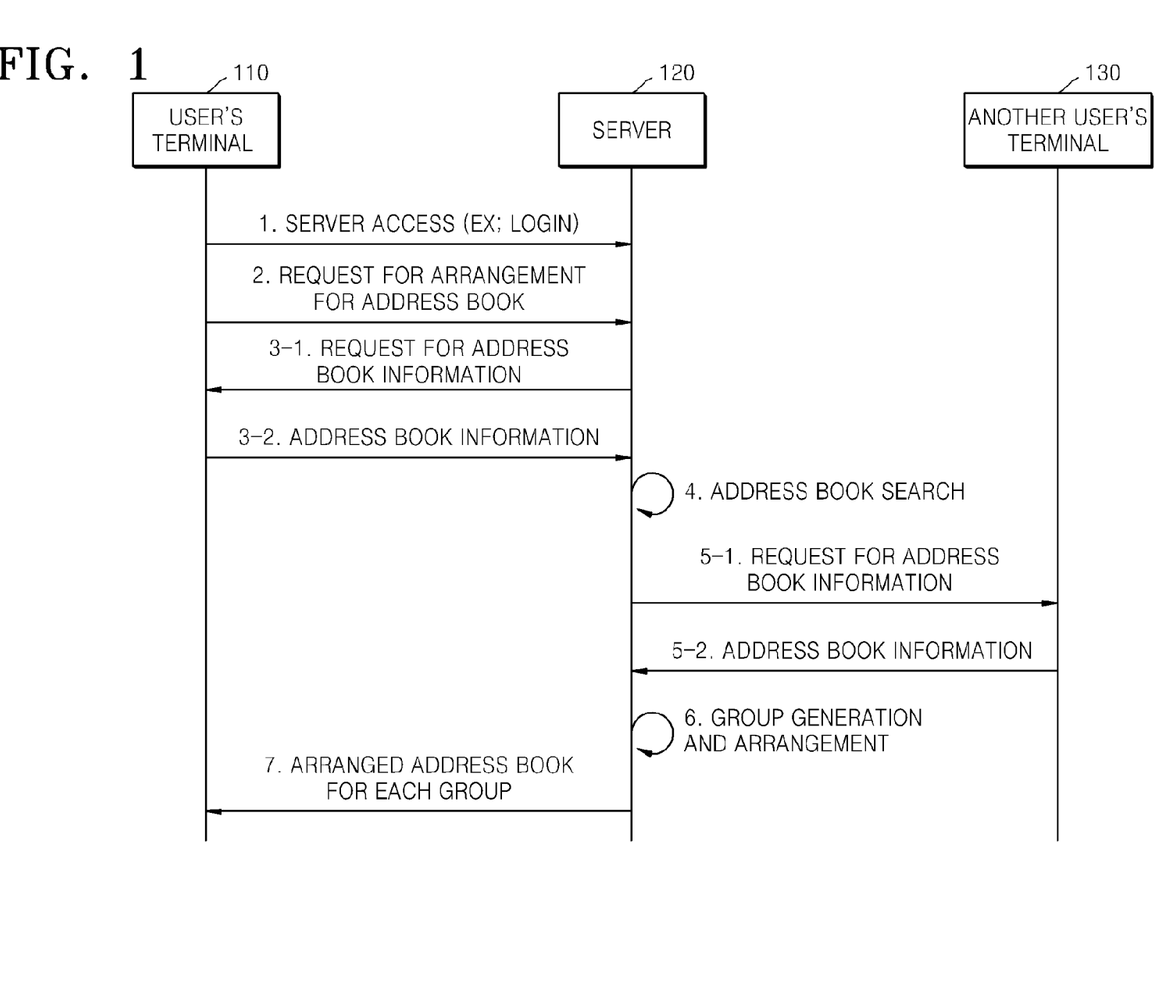
FIG. 1 is a conceptual diagram illustrating a method of managing an address book, according to an exemplary embodiment.

FIG. 1 is a conceptual diagram illustrating a method of managing an address book, according to an exemplary embodiment.

The address book may include various information such as users' names (or titles), phone numbers, group information, e-mail addresses, gender distinctions, birthdates, addresses, fax numbers, photos, and the like. In addition, the group information may include group characteristics besides group names. The group characteristics are arbitrarily defined classification standards of groups, and groups having the same characteristic may be classified according to the same characteristic regardless of the group names. For example, a user may set the group names as "high school," "university," and "graduate school," and set the group characteristics for the three groups as "friend." The group characteristics may be defined by the user, and may be defined by a provider that provides an address book service. A method of defining the group characteristics may use an inclusion relation, a same/similar relation, or a relative relation, but is not limited thereto.

Referring to FIG. 1, a user accesses a server 120 from the user's terminal 110. Here, the user may be a user registered in the server 120. Registration may be performed by inputting an ID and a password, and may be performed by other methods. For example, it is possible to be registered in the server 120 through a communication company when opening a mobile device or by using a service or application included in the mobile device.

When the server 120 is accessed, the user requests the server 120 to organize the user's address book stored in the user's terminal 110. The user may access the server 120 by using a login, and a specific process may not be required to access the server 120 in a case where the server 120 recognizes the user's terminal 110. If the server 120 receives the request to organize the user's address book from the user, the server 120 requests the user's terminal 110 to transmit the user's address book stored in the user's terminal 110. Thus, the user's terminal 110 transmits the user's address book to the server 120. In addition, it is possible to request the server 120 to organize the user's address book while transmitting the user's address book stored in the user's terminal 110 to the server 120. If the user's address book has already been stored in the server 120, it is possible to confirm whether there is any changed item in the previously stored address book and to synchronize the address book stored in the server 120 and the address book stored in the user's terminal 110.

The server 120 searches an address book of another user that includes information about the user. Here, the server 120 may search an address book stored in the server 120, or may request the other user's terminal 130 to send the other user's address book stored in the other user's terminal 130, receive the other user's address book from the other user's terminal 130, and then search the received address book.

The server 120 generates a representative group by analyzing whether the user is included in any group in the other user's address book, which includes information about the user, and then generates a new address book for the user. Various methods of generating the new address book according to exemplary embodiments are described below.

If generation of the new address book is completed, the server 120 transmits the new address book, which is arranged in groups, to the user's terminal 110, and the user's terminal 110 finally stores the received address book in the user's terminal 110.

Figure 2:
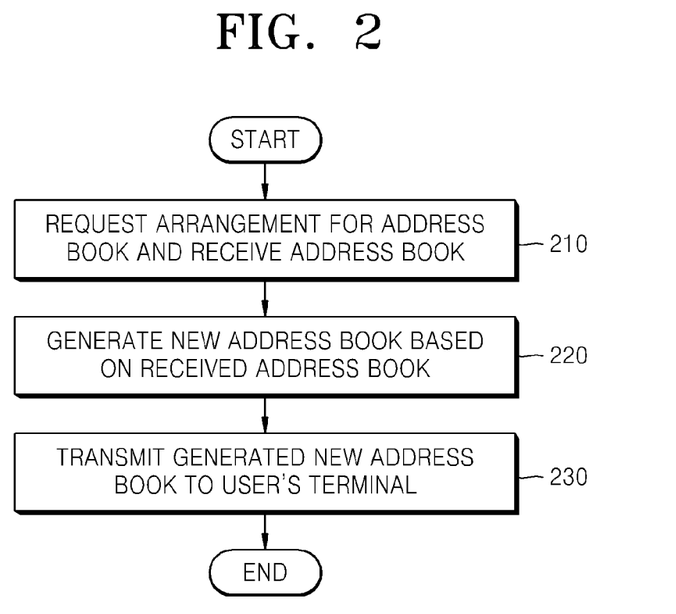
FIG. 2 is a flowchart illustrating a method of managing an address book in a server, according to an exemplary embodiment.

FIG. 2 is a flowchart illustrating a method of managing an address book in a server, according to an exemplary embodiment. Referring to FIG. 2, in operation 210, a server receives a request to organize a user's address book and receives the address book from the user's terminal connected to the server. In operation 220, the server generates a new address book based on the received address book. In operation 230, the server transmits the generated new address book to the user's terminal.

Figure 3:
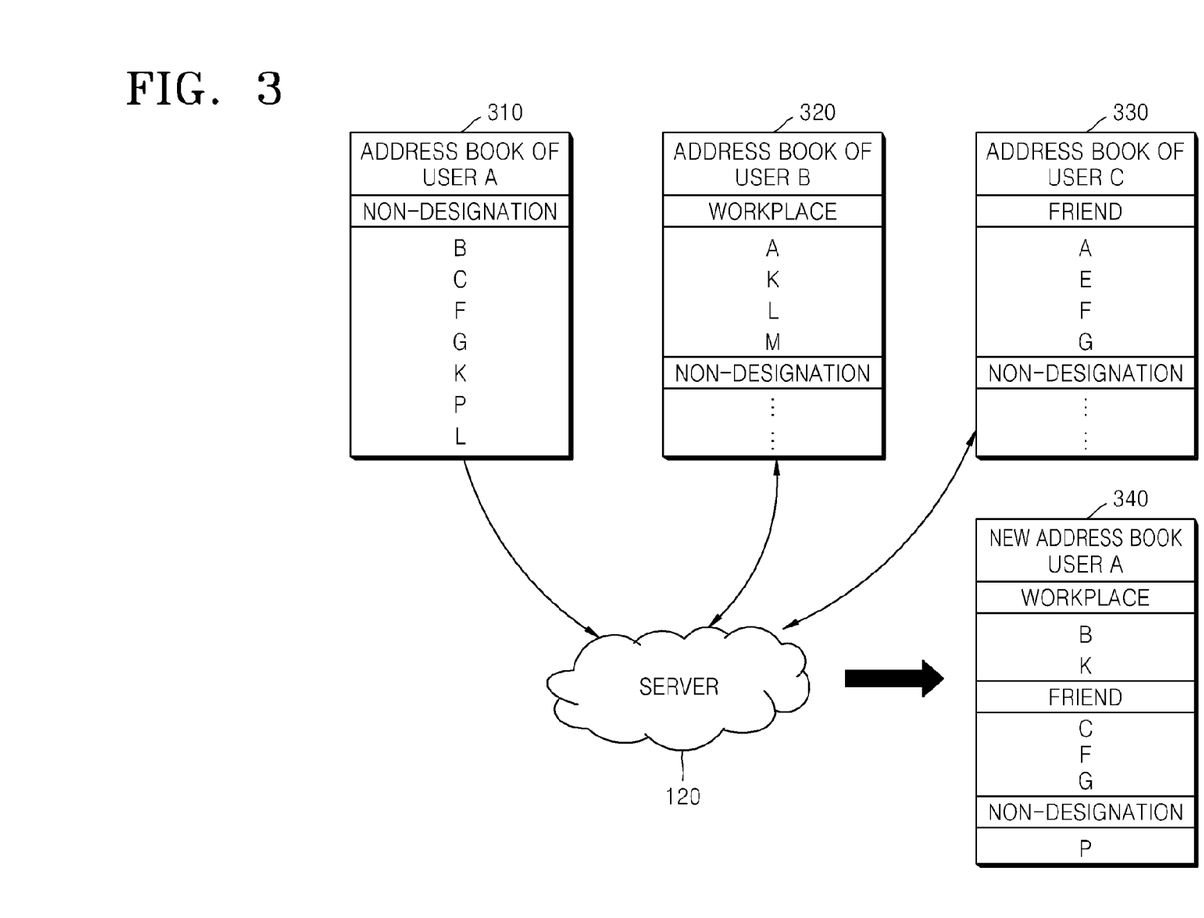
FIG. 3 is a diagram illustrating a method of generating a new address book, according to an exemplary embodiment.

FIG. 3 is a diagram illustrating a method of generating a new address book, according to an exemplary embodiment. In FIG. 3, if a terminal of a user A accesses a server 120 and transmits an address book 310 of the user A to the server 120 while requesting the server 120 to organize the address book 310, the server 120 searches for address books of other users for arranging the address book 310 of the user A in groups, based on the address book 310 of the user A. The other users' address books may be previously stored in the server 120 by using the above-stated registration process, and may be sent from terminals of the other users by request. With respect to a user B not grouped in the address book 310 of the user A, since the user A and users K, L, and M are arranged in a "workplace" group in an address book 320 of the user B, the server 120 determines that the users A, B, K, L, and M belong to the "workplace" group. Since the users B, K, and L from among the users arranged the "workplace" group are included in the address book of the user A, a group name of the group including the users B, K, and L is set to "workplace", and the users B, K, and L are arranged in the "workplace" group.

In the same manner, referring to an address book 330 of the user C, the user A, C, E, F, and G are arranged in a "friend" group, and thus, a group name of the group including the users C, F, and G from among the users of the address book 310 of the user A is set to "friend."

A new address book 340 for the user A is generated through the above process and is generated such that the users B, L, and K are arranged in the "workplace" group, the users C, F, and G are arranged in the "friend" group, and the user P, of which there is no found related information, is arranged in a "non-designation" group.

Figure 4:
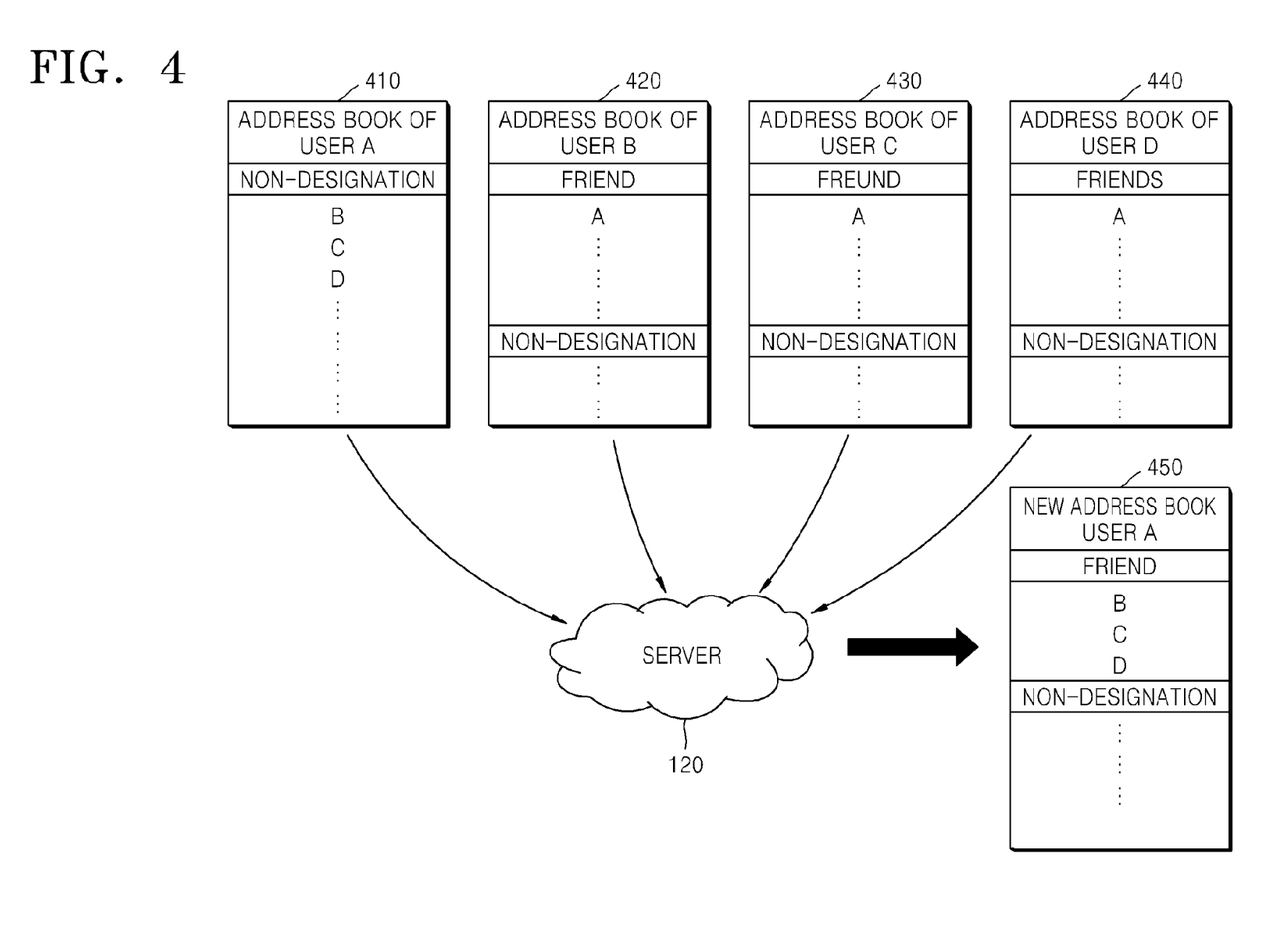
FIG. 4 is a diagram illustrating a method of determining a representative group name by recognizing groups having group names having similar meanings as the same group, according to an exemplary embodiment.

FIG. 4 is a diagram illustrating a method of determining a representative group name by recognizing groups having group names having similar meanings as the same group, according to an exemplary embodiment. Referring to FIG. 4, in an address book 420 of a user B, a user A is arranged in a "friend" group. However, the user A is arrange in a "Freund" group in an address book 430 of a user C, and is arranged in a "friends" group in an address book 440 of a user D. In this case, the server recognizes groups having group names having similar meanings such as "friend", "Freund", and "friends" as the same group, and generates a new address book 450 by setting "friend" as a representative group name. In the process of recognizing groups having group names having similar meanings as the same group, characteristics of the groups may be the same as each other, and at least one set of group names having similar meaning may be previously set in the server. In the method of setting a representative group name, group names of address books of searched other users may be presented and then a user may select one of the presented group names, or the user may directly set the representative group name. A method of determining whether group names have similar meanings is not limited to as described in the present specification.

Figure 5:
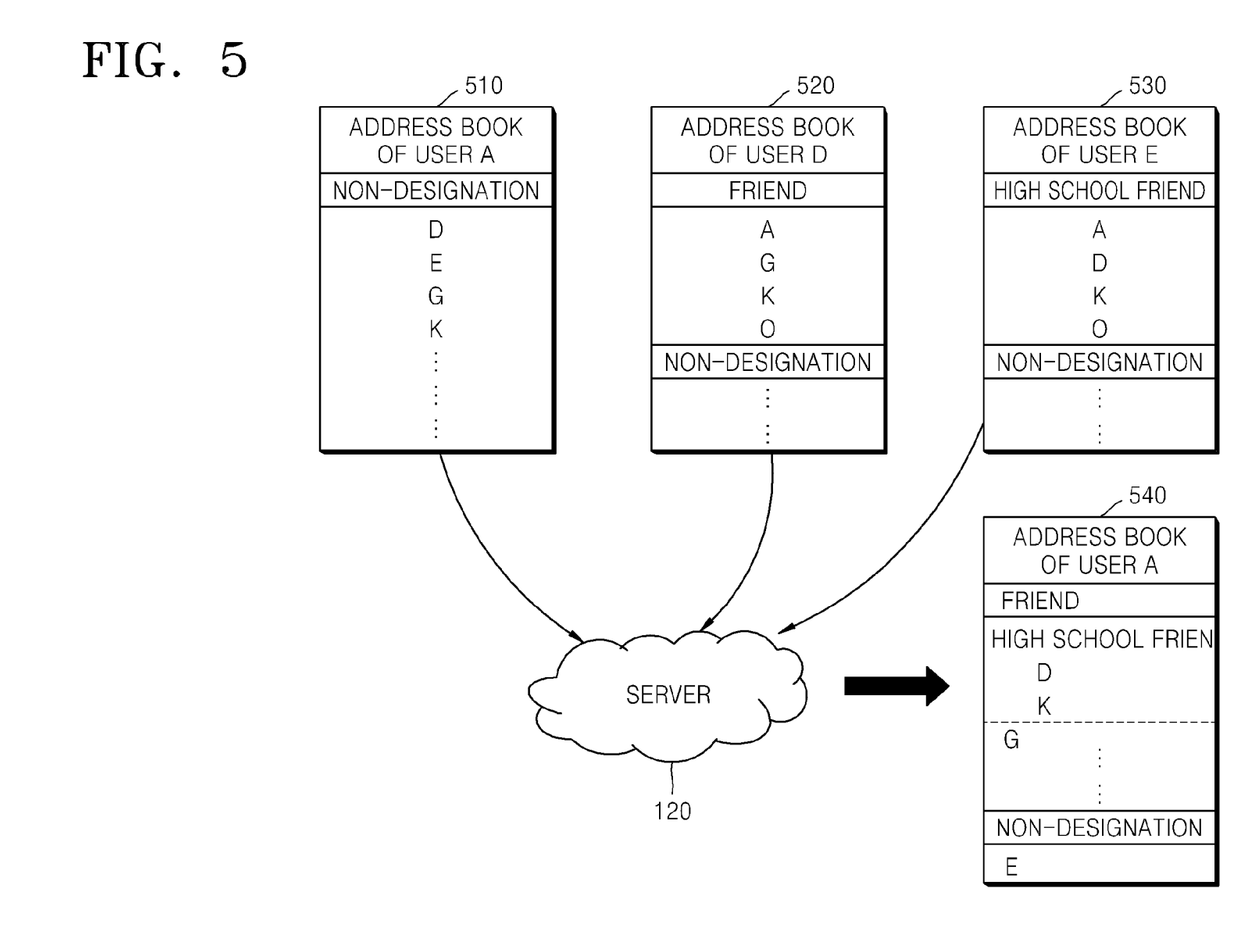
FIG. 5 is a diagram illustrating a method of generating an address book by using a hierarchical structure, according to an exemplary embodiment.

FIG. 5 is a diagram illustrating a method of generating an address book by using a hierarchical structure, according to an exemplary embodiment. Based on an address book 510 of a user A, in which users D, E, G, and K are not grouped, address books including the user A may be searched. In this case, referring to FIG. 5, an address book 520 of the user D includes the users A, G, and K and a user O arranged in a "friend" group, and an address book 530 of the user E includes the users A, D, K, and O arranged in a "high school friend" group. Thus, the users D, G, and K may be arranged in the "friend" group, and the users D and K from among the users D, G, and K may be arranged in the "high school friend" group. Thus, it is possible to generate a new address book 540 for the user A having a hierarchical structure including the "friend" group and the "high school friend" group.

Figure 6:
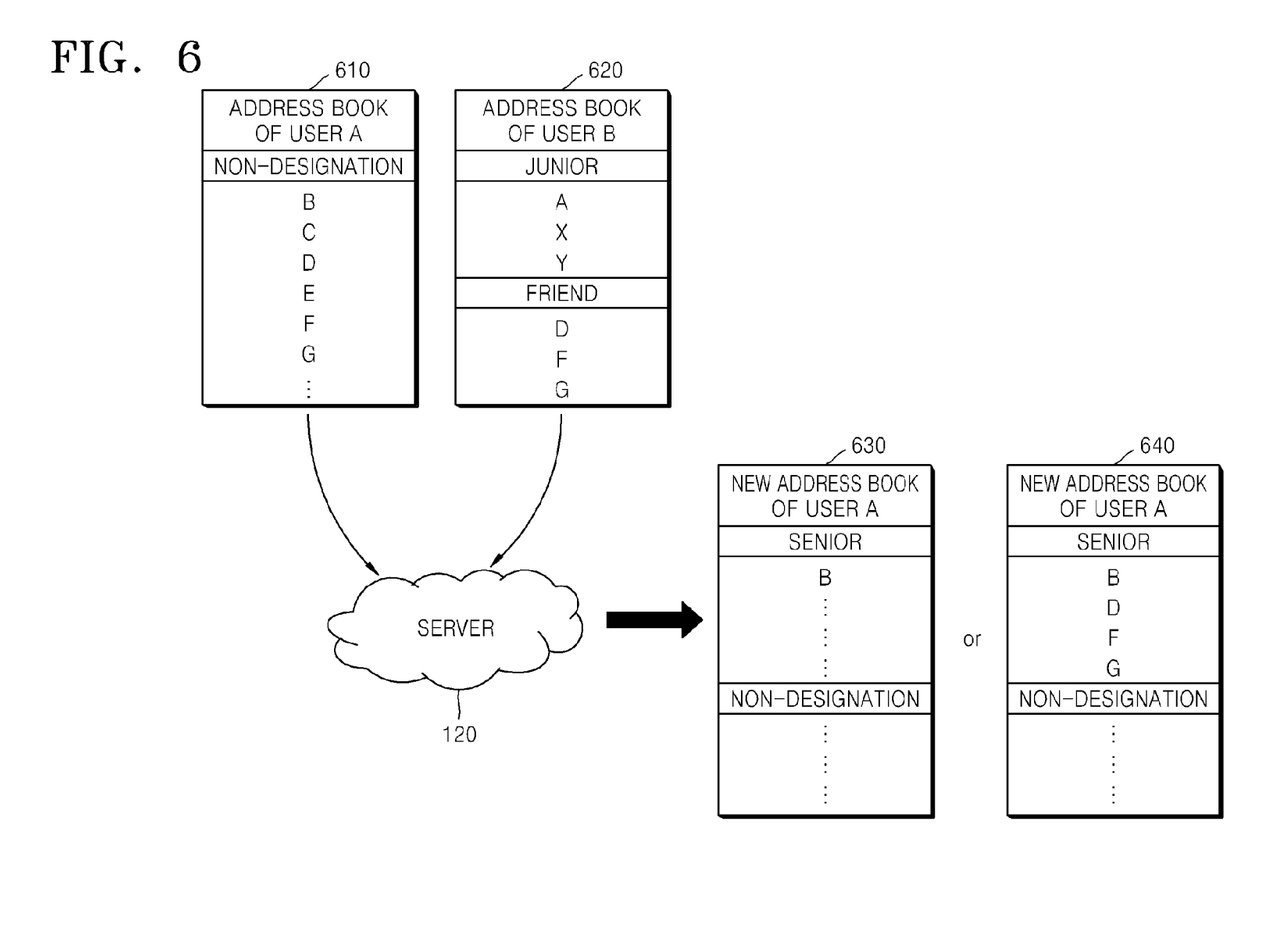
FIG. 6 is a diagram illustrating a method of generating an address book for a user having relative relationship to another user, according to an exemplary embodiment.

FIG. 6 is a diagram illustrating a method of generating an address book for a user having relative relationship to another user, according to an exemplary embodiment. In a case of collecting information of an address book 620 of a user B based on an address book 610 of a user A, the user A is arranged in a "junior" group in the address book 620 of the user B. In such cases, it is possible to generate a new address book 630 for the user A by setting a "senior" group as a representative group, considering the relationship between the user A and the user B based on the information that the user A is arranged in a "junior" group in the address book 620 of the user B. A group name set having this corresponding relation may be previously set in a server, and a user may directly select a representative group name. If a group characteristic of the "junior" group in the address book 620 of the user B is defined as "junior", a proper group name, for example, "senior," may be presented according to pre-defined group characteristics.

Furthermore, if users D, F, and G are registered as friends of the user B in the address book 620 of the user B and the user B is a senior of the user A, the users D, F, and G, who are friends of the user B, may also be seniors of the user A. Thus, a new address book 640 for the user A may be generated automatically or conditionally (for example, according to an approval of the user A) to include the users B, D, F, and G in the generated "senior" group, which is the representative group.

According to an exemplary embodiment, when an address book of a user A in a server and an address book of the user A in the user A's terminal are different from each other (for example, in a case where the user A edits a portion of the address book of the user A in the user A's terminal, or in a case where the user A accesses the server through an account in a web site and then edits a portion of the address book of the user A in the server), it is possible to synchronize the address book of the user A in the server and the address book of the user A in the user A's terminal, based on either the address book of the user A in the server or the address book of the user A in the user A's terminal. A criterion for the synchronization may be the most recently amended address book, or a user may set the criterion for the synchronization.

According to an exemplary embodiment, in a case where a user registered in a server changes the user's information, the server may inform a terminal having an address book of another user that includes information about the user about the changes. For example, when information of a user B is registered in an address book of a user A, in a case where the user B changes the user B's phone number (or a birthdate, an address, or the like), it is possible to inform the user A of this change and also to confirm whether the change is reflected in the address book of the user A. In a case where another user's information is changed and in a case where the address book of the user A in the server is accessed and changed through an account in a web site, it is possible to prevent the address book of the user A from being damaged and maliciously changed by others, by informing the user A's terminal of the changes.

According to an exemplary embodiment, a new address book may be generated with reference to an address book in a social network system (SNS). An address book stored in a user's terminal or a server is not limited to an address book used in a mobile device, such as a cellular phone or smart phone. The address book stored in the user's terminal or the server may be an address book in a social network system (SNS) or an address book provided from a web service provider.

Figure 7:
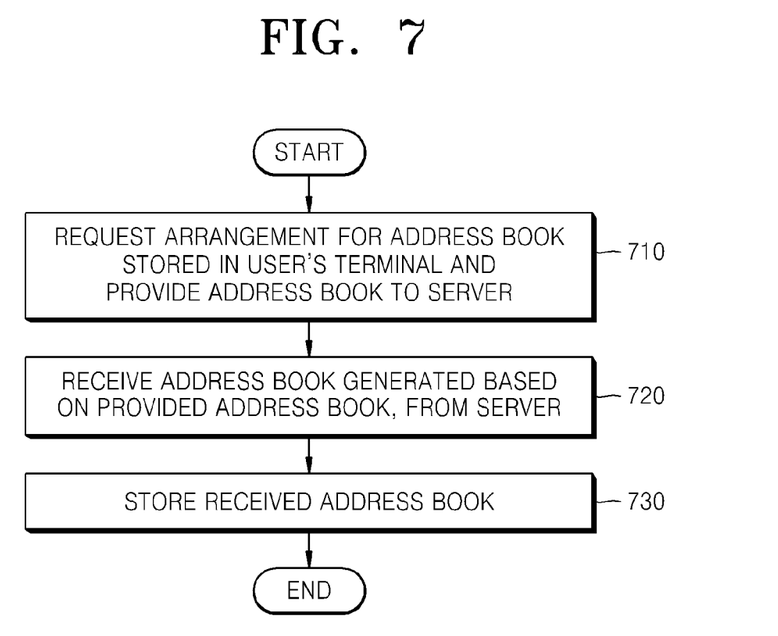
FIG. 7 is a flowchart illustrating a method of managing an address book in a user's terminal, according to an exemplary embodiment.

FIG. 7 is a flowchart illustrating a method of managing an address book in a user's terminal, according to an exemplary embodiment. Referring to FIG. 7, in operation 710, a user's terminal accesses a server that is to store an address book therein, transmits a request to organize an address book, and transmits an address book stored in the user's terminal to the server. In operation 720, the user's terminal receives a new address book generated based on the transmitted address book from the server. In operation 730, the user's terminal stores the received address book in the user's terminal.

Figure 8:
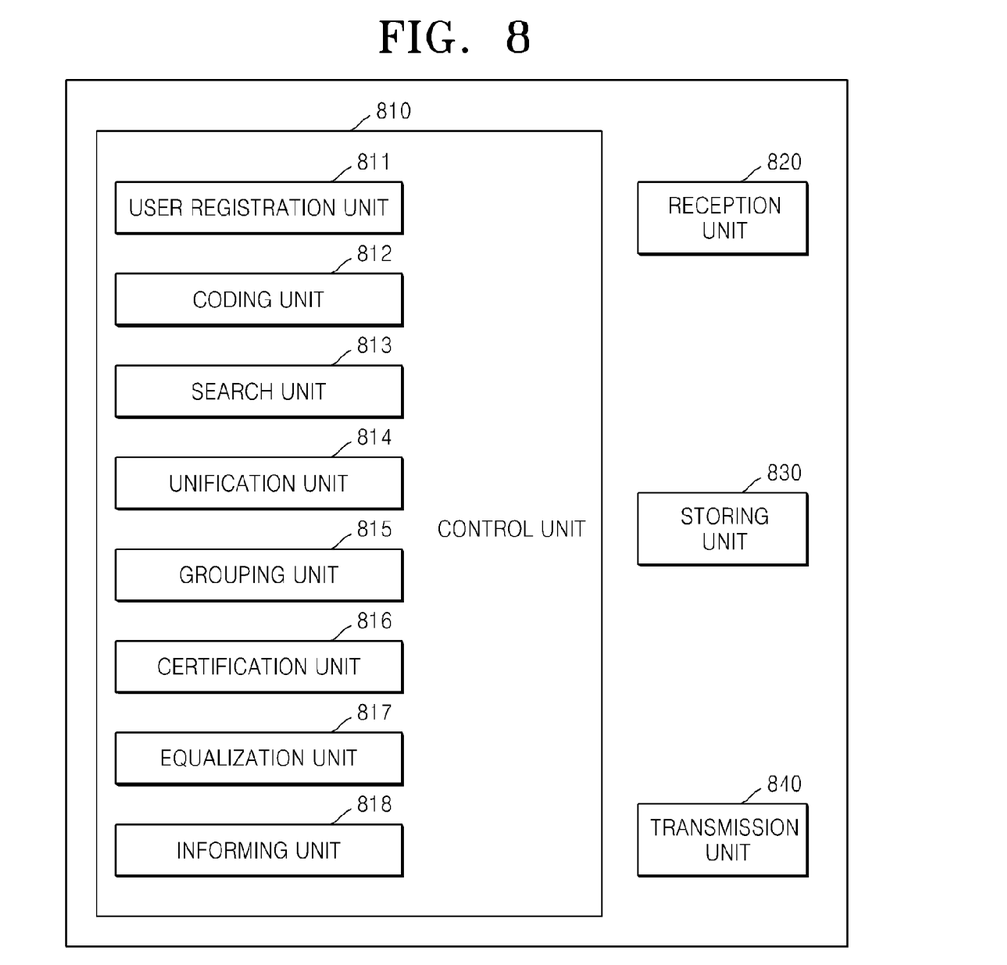
FIG. 8 is a function block diagram illustrating an apparatus for managing an address book according to an exemplary embodiment.

FIG. 8 is a function block diagram illustrating an apparatus for managing an address book, according to an exemplary embodiment. FIG. 8 illustrates an embodiment of a server for managing the address book.

Referring to FIG. 8, a control unit 810 generates a new address book based on an address book provided from a user's terminal. The control unit 810 may include a user registration unit (or module) 811, a coding unit 812, a search unit 813, a unification unit 814, a grouping unit 815, a certification unit 816, an equalization unit 817, an informing unit 818.

The user registration unit 811 manages the above-stated user registration process, and the coding unit 812 manages a coding process for an address book stored in a server. A coding method may be, for example, "Hash," but the coding method is not limited thereto.

The search unit 813 searches address books of other users including information about the user, based on the address book provided from the user's terminal. The search unit 813 may search address books stored in the server. In addition, the search unit 813 may request the other users' terminals to send address books, receive the address books from the other users' terminals, and then search the received address books. However, the searching method is not so limited.

The unification unit 814 sets a representative group according to the above search result. Here, in a case where it is possible to express groups by using a hierarchical structure, the groups are generated by using the hierarchical structure. In a case where information of searched groups includes a relative concept, groups corresponding to the relative concept are generated. However, setting the representative group is not so limited.

The grouping unit 815 generates and arranges addresses, for each of the groups set in the unification unit 814, by comparing and matching address books of the groups set in the unification unit 814 and the address book of the user A.

The certification unit 816 manages a certification process for the user before accepting/sending information about the user. The certification process may be performed only at a first time when a request to organize the address book of the user's terminal is received, or may be changed according to the user's setting. The certification may occur when the user accesses the server, and the certification may be performed when necessary before accepting/sending information about the address book of the user via a notice.

The equalization unit 817 performs equalization (i.e., synchronization) if the user's address book managed in the server and the user's present address book are different from each other.

The informing unit 818 informs a user of changes in a case where a group name used by other users is changed or an address book is changed, and enables the user to apply the changes to the user's address book. In addition, the informing unit 818 may process informing operations in various cases where a notice is necessary, such as a case where there is update information about an address book or a case where an approval of another user is necessary.

A reception unit 820 receives the request to organize the address book of the user's terminal and the address book transmitted from the user's terminal.

A storing unit 830 stores the searched address books of the other users and a newly generated address book as well as the received address book.

A transmission unit 840 transmits the newly generated address book to the user's terminal.

Figure 9:
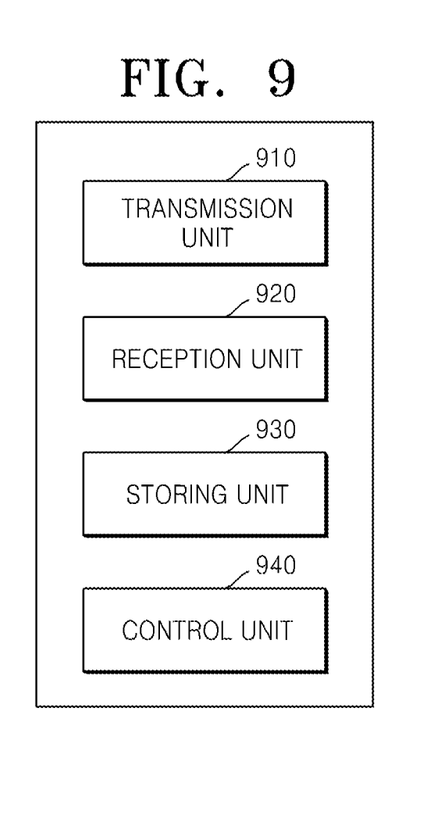
FIG. 9 is a function block diagram illustrating an apparatus for managing an address book according to another exemplary embodiment.

FIG. 9 is a function block diagram illustrating an apparatus for managing an address book, according to another exemplary embodiment. FIG. 9 illustrates an exemplary embodiment of a user's terminal for managing the address book.

A transmission unit 910 sends a server a request to organize an address book stored in a user's terminal and transmits the address book to the server. In addition, the transmission unit 910 may previously send to the server a request for accessing the server to send the request to organize the address book and the address book to the server.

A reception unit 920 receives a new address book generated based on the received address book from the server.

A storing unit 930 stores the received address book, and the control unit 940 operates similar to the equalization unit of FIG. 8.

The exemplary embodiments may be embodied by an apparatus that includes a bus coupled to every unit of the apparatus, at least one processor (e.g., central processing unit, microprocessor, etc.) that is connected to the bus for controlling the operations of the apparatus to implement the above-described functions and executing commands, and a memory connected to the bus to store the commands, received messages, and generated messages.

As will also be understood by the skilled artisan, the exemplary embodiments, including units and/or modules thereof, may be implemented by any combination of software and/or hardware components, such as a Field Programmable Gate Array (FPGA) or Application Specific Integrated Circuit (ASIC), which performs certain tasks. A unit or module may advantageously be configured to reside on the addressable storage medium and configured to execute on one or more processors or microprocessors. Thus, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or modules or further separated into additional components and units or modules.

Alternatively, the exemplary embodiments may be embodied in a program command form which may be executed through various computer units and recorded in computer-readable media. The computer-readable media may contain program commands, data files, data structures, and combinations thereof. The program commands recorded in the medium may be specially designed for the exemplary embodiments, or may be well-known by those skilled in computer software. The computer-readable media may include hardware devices specially configured to store and execute program commands. For example, magnetic media, such as a hard disk, a floppy disk and a magnetic tape, optical media, such as a CD-ROM and a DVD, a magneto-optical media, such as a floptical disk, a ROM, a RAM and a flash memory may be used as the computer-readable media. The program commands may include a machine language prepared by a compiler and a high-level language code prepared by an interpreter so as to be executed by a computer. The above-mentioned hardware devices may be configured to operate as one or more software modules to operate the exemplary embodiments and vice versa.

While the exemplary embodiments been particularly shown and described, it will be understood by one of ordinary skill in the art that various changes in form and details may be made therein without departing from the spirit and scope of the invention as defined by the following claims. The exemplary embodiments should be considered in a descriptive sense only and not for purposes of limitation. Therefore, the scope of the invention is defined not by the detailed description of the invention but by the following claims, and all differences within the scope will be construed as being included in the present invention.

What is claimed is:

1. A method of managing an address book in a server, the method comprising:
   receiving from a user's terminal a request to organize the address book, the request including the address book;
   generating a new address book based on the received address book; and
   transmitting the generated new address book to the user's terminal,
   wherein the address book includes information about a first contact and a second contact, and
   wherein, the generating the new address book comprises:
      collecting a first address book of the first contact and a second address book of the second contact, wherein the first and second address books include information about the user;
      identifying a first group which is associated with the information about the user, in the first address book;
      identifying a second group which is associated with the information about the user, in the second address book;
      generating a first representative group having a name corresponding to a name of the first group and including the information about the first contact;
      generating a second representative group having a name corresponding to a name of the second group and including the information about the second contact; and
      arranging the first and second representative groups in the new address book.

2. The method of claim 1, wherein the generated new address book is generated by using a hierarchical structure.

3. The method of claim 1, wherein, if the collected first and second address books have a relative concept, the generated new address book is an arranged address book based on:
   a representative group set in a relative relation to the user, and
   group information having a similar relation to the user collected from the first and second address books.

4. The method of claim 1, further comprising synchronizing an address book of the server and the address book of the user's terminal.

5. The method of claim 1, further comprising, if there is a change in an address book managed in the server, informing the user about the change.

6. The method of claim 1, wherein the address book comprises at least one of an address book of a mobile device and an address book of a social network system (SNS).

7. A method of managing an address book in a user's terminal, the method comprising:
   transmitting to a server a request to organize the address book stored in the user's terminal, the request including the address book;
   receiving from the server a new address book generated based on the provided address book; and
   storing the received new address book,
   wherein the address book includes information about a first contact and a second contact, and
   wherein, the new address book is generated by:
      collecting a first address book of the first contact and a second address book of the second contact, wherein the first and second address books include information about the user;
      identifying a first group which is associated with the information about the user, in the first address book;
      identifying a second group which is associated with the information about the user, in the second address book;
      generating a first representative group having a name corresponding to a name of the first group and including the information about the first contact;
      generating a second representative group having a name corresponding to a name of the second group and including the information about the second contact; and
      arranging the first and second representative groups in the new address book.

8. The method of claim 7, further comprising synchronizing an address book of the server and the address book of the user's terminal.

9. The method of claim 7, wherein the address book comprises at least one of an address book of a mobile device and an address book of a social network system (SNS).

10. An apparatus for managing an address book, the apparatus comprising:
    a storing unit that stores the address book;
    a reception unit that receives from a user's terminal a request to organize the address book, the request including the address book;
    a control unit that generates a new address book based on the address book received by the reception unit; and
    a transmission unit transmits the generated new address book to the user's terminal,
    wherein the address book includes information about a first contact and a second contact, and
    wherein, to generate the new address book, the control unit collects a first address book of the first contact and a second address book of the second contact the first and second address books including information about the user, identifies a first group which is associated with the information about the user, in the first address book, identifies a second group which is associated with the information about the user, in the second address book, generates a first representative group having a name corresponding to a name of the first group and including the information about the first contact, generates a second representative group having a name corresponding to a name of the second group and including the information about the second contact, and arranges the first and second representative groups in the new address book.

11. The apparatus of claim 10, wherein the control unit is configured to generate the new address book by using a hierarchical structure.

12. The apparatus of claim 10, wherein, if the collected first and second address books have a relative concept, the control unit is further configured to generate the new address book based on:

a representative group set in a relative relation to the user, and group information having a similar relation to the user collected from the first and second address books.

13. The apparatus of claim 10, wherein the control unit is further configured to synchronize an address book of the apparatus for managing an address book and the address book of the user's terminal.

14. The apparatus of claim 10, wherein, if there is a change in an address book managed in the apparatus for managing an address book, the control unit is further configured to inform the user about the change.

15. An apparatus for managing an address book, the apparatus comprising:
  a transmission unit that transmits to a server a request to organize the address book stored in a user's terminal, the request including the address book and the server storing another address book;
  a reception unit that receives from the server a new address book generated based on the provided address book; and
  a storing unit that stores the received new address book,
  wherein the address book includes information about a first contact and a second contact, and
  wherein, the new address book is generated by:
    collecting a first address book of the first contact and a second address book of the second contact, wherein the first and second address books include information about the user;
    identifying a first group which is associated with the information about the user, in the first address book;
    identifying a second group which is associated with the information about the user, in the second address book;
    generating a first representative group having a name corresponding to a name of the first group and including the information about the first contact;
    generating a second representative group having a name corresponding to a name of the second group and including the information about the second contact; and
    arranging the first and second representative groups in the new address book.

16. The apparatus of claim 15, further comprising a control unit that synchronizes the another address book stored in the server and the address book of the user's terminal.

17. An address book organizing device, comprising:
  a reception unit that receives from a mobile terminal of a first user a request to organize a first address book of the first user, the request comprising the first address book, and the first address book comprising an entry in the first address book that identifies a second user;
  a processor that determines a second address book of the second user based on the entry in the first address book, determines a group of the second address book in which the first user is included, organizes the first address book of the user to include the group of the second address book, and includes the entry in the group in the organized first address book; and
  a transmission unit that transmits the organized first address book to the mobile terminal of the first user.

18. The device of claim 17, wherein the entry in the first address book received by the reception unit is ungrouped with other entries in the first address book.

19. The device of claim 17, wherein the processor determining the second address book comprises receiving the second address book from a second mobile terminal of the second user.

20. A method of managing an address book including information about other users, in a server, the method comprising:
  receiving, from a user's terminal, a request to organize the address book, the request including the address book;
  collecting address books of the other users that include information about the user;
  determining whether the information about the user is included in a group included in at least one of the collected address books;
  generating a representative group including information about at least one other user among the information about the other users, based on a result of the determining;
  generating a new address book that is arranged to include the representative group, based on the received address book; and
  transmitting the generated new address book to the user's terminal.

* * * * *